UNITED STATES PATENT OFFICE 2,142,936

STABILIZATION OF ETHERS

Ellis T. Crawford, Jr., and Rodolphus K. Turner, Charleston, W. Va., assignors to Carbide and Carbon Chemicals Corporation, a corporation of New York No Drawing. Application April 30, 1937, Serial No. 139,952

5 Claims. (Cl. 23—250)

This invention provides an improvement in the art of preserving ethers. More particularly, it is concerned with the preservation of ethers, including cyclic ethers, substituted ethers and the like, by an agent, novel for this purpose, consisting of the compound, monobenzylpara-aminophenol

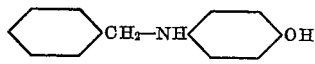

It is well known that ethers, even when in a pure condition, normally tend to deteriorate with the formation of deleterious products which are removable only with great difficulty. For instance, the ethers may deteriorate by reacting with oxygen to form peroxides, which in turn by interaction or decomposition or both, yield aldehydes, acids, or other substances. This deterioration increases, of course, with the lapse of time, and is favored by the presence of dissolved oxygen in the ether as ordinarily manufactured; exposure to light, particularly direct sunlight; exposure to heat, especially in a sealed vessel; and contact with contaminating metals which are found in certain containers. Even a small proportion of these impurities is sufficient to prohibit the use of the ethers for the purposes for which they are ordinarily intended. The original state of purity of the ethers can be controlled for a short time by the processes by which they are made, but it is not always possible to preserve, store, and ship them in their original condition because of their inherent tendency to deteriorate spontaneously. Various proposals have been made to inhibit this deterioration, such as adding special compounds, usually metals, to the ethers, or by constructing the container of special metals. When large volumes of material are to be handled, containers made of metallic copper or metallic aluminum, or iron alloys, such as the stainless steels, have been employed. It is also a common practice to use glass containers for substances which are to be preserved in a state of extreme purity, but it has been found that the substances with which this invention is primarily concerned deteriorate under ordinary storage conditions, even in glass containers.

It has been discovered that the deteriorating action of the ethers with which this invention is more particularly concerned can be markedly decreased by contacting these compounds with the effective preserving agent, monobenzyl-para-aminophenol.

Some of the substances susceptible to preservation in the manner of this invention, and in which substances the novel preservative is readily soluble, include cyclic ethers, for instance ethylene and propylene oxides and dioxane; dialkyl ethers, such as diethyl and diisopropyl ethers and their homologues; the mono and dialkyl ethers of the mono and polyalkylene glycols, and the substituted derivatives thereof.

In the preservative of the materials above mentioned, very good results are obtained by incorporating in these ethers, from about 0.0010% by weight to about 0.12% by weight of the preservative. In this range, optimum results are normally attained by using approximately 0.0016% by weight. Amounts most suitable will depend, of course, upon the compound to be preserved. A proposed manner of adding this material to the ether is to form first a concentrated (but not saturated) solution of the preservative in the ether, and then add sufficient amounts of this stock solution to the body of the ether to be preserved to obtain the concentration for the most effective preserving action. For example, a satisfactorily stabilized ether was obtained by dissolving 1.6% by weight of monobenzyl-para-aminophenol in the ether, and diluting one volume of this solution with 999 volumes of untreated ether. Amounts of the preservative, greater than set forth in the ranges given above, increase the resistance of the ethers to deterioration, but at the same time the residue on distillation is increased and some coloration appears. In the preservation of other ethers, the method of incorporating the stabilizer is the same as described above.

The following examples will serve further to illustrate the invention.

Example I

Several 1 gallon lots of diisopropyl ether stabilized with 0.0001 pound of monobenzyl-para-aminophenol, and like quantities of untreated ether, were stored in glass containers for a period of about 3½ months. At the end of this time, the stabilized ether showed little or no signs of deterioration, while the unstabilized material was unfit for commercial use. In fact, the unstabilized ether was comparatively unuseable at the end of 14 or 15 days of storage, even when there was no evidence of any impurities in the ether when first stored. When allowed to stand for a period of about 6 months in the same kind of container, the stabilized ether exhibited the same minimum of deleterious impurities as it had when stored for the shorter period of time, while the unstabilized ether was wholly unuseable. A brown glass container was used to determine the relative properties of the stabilized and unstabilized ethers, and at the end of about 5 months the degree of deterioration of the unstabilized ether was substantially the same as when noted above, while the stabilized material was comparatively free from impurities. In order to demonstrate the large scale applicability of the novel preserving agent, tests were carried out under substantially the same conditions in an 8000 gallon steel tank, and these tests gave equally satisfactory results.

Example II

A 102 gallon lot of diethyl ether stabilized with 0.0016% by weight of monobenzyl-para-aminophenol, and a like amount of unstabilized ether, were stored over a period of about 3 months in containers constructed of clear glass, brown glass, and drum iron, respectively. At the end of that time there was absolutely no trace of any deleterious impurities in the stabilized ether.

Similar tests were conducted with the monoalkyl and dialkyl ethers of the mono and polyalkylene glycols with satisfactory results. It was found that in the case of these materials, in which the preservative was approximately 2% soluble at room temperature, substantially 0.1 pound of preserving agent per 1000 gallons of ether provided effective stabilizing action when the compounds were stored for extended periods.

The use of the new preserving agent is in no way detrimental to the utilization of the ether for most of its chemical uses, and at the same time, it is effective to prevent the formation of deleterious impurities on storage, regardless of the nature of the storage container. If the ethers must be wholly free from foreign substances, including the minute amounts of stabilizer used, this may be accomplished at the time of use by a simple purification process, such as refluxing the ether with acid, neutralizing with alkali, and distilling under reduced pressure. Other purification methods can, of course, be employed. Monobenzyl-para-aminophenol may be used in almost unlimited amounts, but special amounts, such as noted above, should be employed in order to avoid formation of excessive residue, coloration or odor.

The invention is susceptible of modification, for instance, with respect to the specific amounts of preserving agent used, and the manner in which the stabilizing agent is incorporated in the ethers. While certain definite proportions have been outlined above as being the most useful, it will be understood that they may vary with conditions of use, and such variations are included within this invention as defined by the appended claims.

We claim:

1. As a composition of matter, a dialkyl ether selected from the group consisting of diethyl and diisopropyl ethers containing mono-benzyl-para-amino-phenol as a preserving agent in amounts sufficient to prevent substantial deterioration of said ether.

2. As a composition of matter, diisopropyl ether containing from about 0.0010% to about 0.12% by weight of monobenzyl-para-aminophenol as a preserving agent.

3. As a composition of matter, diethyl ether containing from about 0.0010% to about 0.12% by weight of monobenzyl-para-aminophenol as a preserving agent.

4. The improvement in preserving diisopropyl ether which consists in so adding monobenzyl-para-aminophenol as a preserving agent as to avoid formation of excessive residue, coloration or odor, said monobenzyl-para-aminophenol being added in amount about 0.0016% by weight.

5. The improvement in preserving diethyl ether which consists in so adding monobenzyl-para-aminophenol as a preserving agent as to avoid formation of excessive residue, coloration or odor, said monobenzyl-para-aminophenol being added in amount about 0.0016% by weight.

ELLIS T. CRAWFORD, Jr.
RODOLPHUS K. TURNER.